US012392171B1

(12) United States Patent
Tollefson

(10) Patent No.: US 12,392,171 B1
(45) Date of Patent: Aug. 19, 2025

(54) LINEAR RETRACTABLE CABLE LOCK

(71) Applicant: Peak Recreational Products, LLC, Brush Prairie, WA (US)

(72) Inventor: Dale Tollefson, Brush Prairie, WA (US)

(73) Assignee: Peak Recreational Products, LLC, Brush Prairie, WA (US)

( * ) Notice: Subject to any disclaimer, the term of this patent is extended or adjusted under 35 U.S.C. 154(b) by 0 days.

(21) Appl. No.: 18/771,172

(22) Filed: Jul. 12, 2024

Related U.S. Application Data

(60) Provisional application No. 63/527,873, filed on Jul. 20, 2023.

(51) Int. Cl.
*E05B 73/00* (2006.01)
*E05B 67/00* (2006.01)
*E05B 71/00* (2006.01)

(52) U.S. Cl.
CPC ........ *E05B 73/0011* (2013.01); *E05B 67/006* (2013.01); *E05B 71/00* (2013.01)

(58) Field of Classification Search
CPC ...... E05B 67/003; E05B 67/006; E05B 71/00; E05B 73/0005; E05B 73/0011
See application file for complete search history.

(56) References Cited

U.S. PATENT DOCUMENTS 1,447,303 A * 3/1923 Harrison ................. B60R 19/48 70/226
2,451,100 A * 10/1948 Lecompte ........... E05B 73/0011 242/379.2
4,023,387 A * 5/1977 Gould ....................... B62H 5/08 137/355.23
5,065,603 A * 11/1991 Kloke .................... B62H 5/003 156/60
5,255,546 A * 10/1993 Saunders ............ E05B 73/0011 70/30
5,513,508 A * 5/1996 Saunders .............. F04B 33/005 70/30
5,768,920 A * 6/1998 DeBevoise ......... E05B 73/0005 70/69
2019/0210509 A1* 7/2019 Hemphill ............ E05B 73/0011
2021/0131146 A1* 5/2021 Kuchler ................ E05B 37/025

* cited by examiner

*Primary Examiner* — Christopher J Boswell
(74) *Attorney, Agent, or Firm* — patenttm.us

(57) ABSTRACT

A linear retractable cable lock comprises a retractable cable lock that is presented in a linear configuration, adapted for mounting, for example in a recreational vehicle bumper, to a vehicle frame, in a truck bed. The cable can be extended for use in securing and locking items, and then retracted when not in use, with the cable conveniently housed inside the bumper, in the bed or to the frame, providing a useful device but not detracting from the appearance of the vehicle when not being use.

18 Claims, 16 Drawing Sheets

18
30
34

18

18
28

16
18
28

16
18
34
30
38

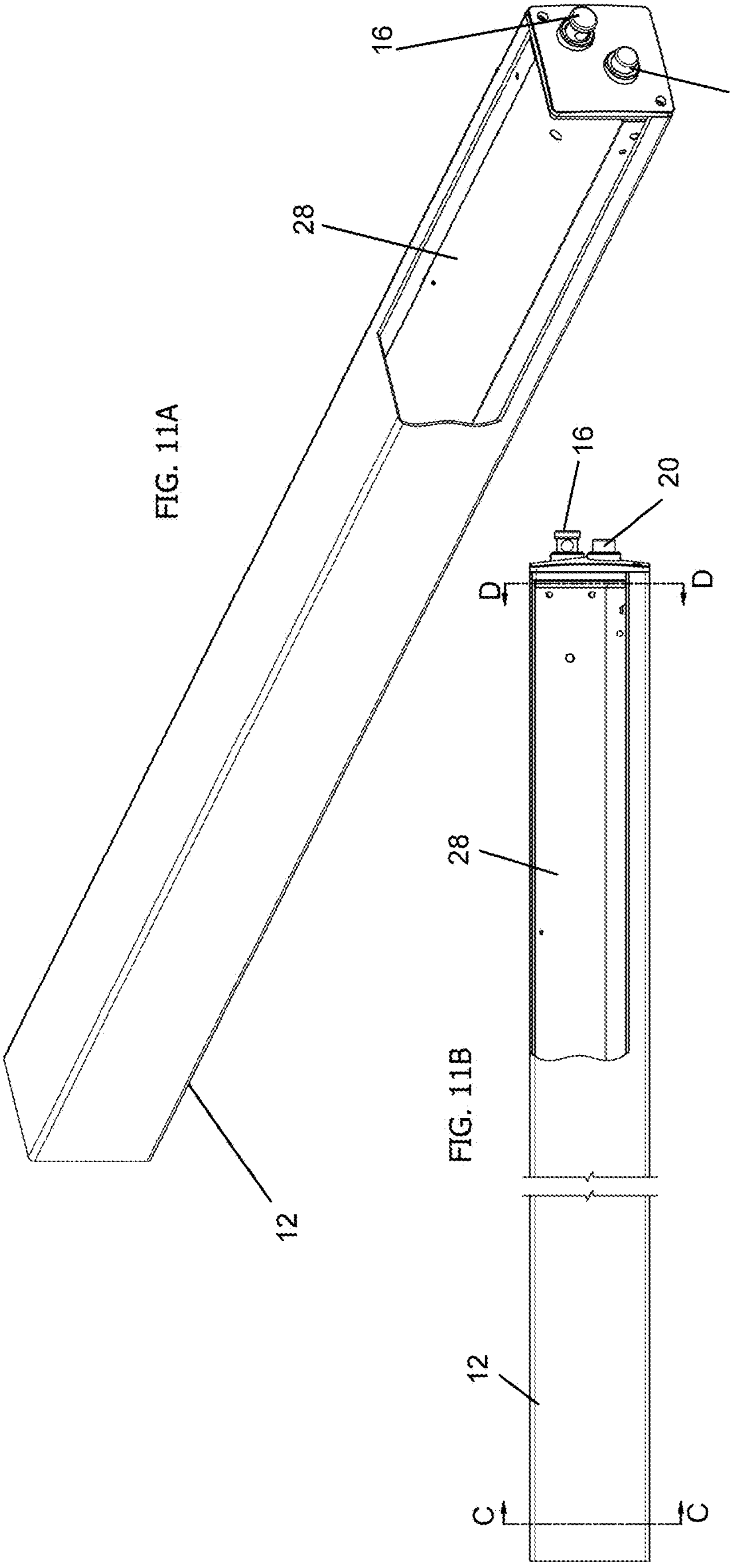
FIG. 11A
FIG. 11B
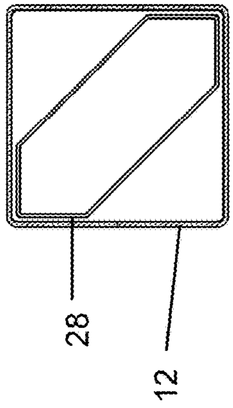
FIG. 11C
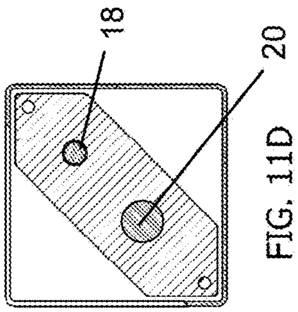
FIG. 11D

C
56
18'
22'
28'
32'
51
34'
D
38'

C
56
18'
22'
28'
38'
32'
51
34'
D

LINEAR RETRACTABLE CABLE LOCK

CROSS-REFERENCE TO RELATED APPLICATIONS

This application claims benefit of U.S. Provisional Patent Application Ser. No. 63/527,873, filed Jul. 20, 2023, entitled LINEAR RETRACTABLE CABLE LOCK.

BACKGROUND

This disclosure relates to a property securement device and, more particularly, to a vehicle mountable personal property securement device comprising a linear retractable cable lock, mountable, for example, to or in a vehicle bumper, in truck bed, to a vehicle frame, or the like.

Cables and locks may be known for assisting securement of personal property such as bicycles, motorcycles, coolers, camping gear, etc., to a large, heavy, and/or immovable object. U.S. Pat. No. 7,428,833, entitled VEHICLE MOUNTABLE PERSONAL PROPERTY LOCK ASSEMBLY, shows a device mounted to, for example, a vehicle bed, with retractable cable to allow locking of items to the vehicle.

Recreational vehicle users are typical types of persons needing such protection, but where to mount the assembly to a recreational vehicle presents issues.

SUMMARY

In accordance with the disclosure, a securement device employs a retractable cable mechanism in a linear package that is adapted for mounting inside a bumper portion of a recreational vehicle, to a vehicle frame, in a truck bed, as examples. The cable can be extended for use in securing and locking items, and then retracted when not in use, with the cable conveniently housed inside a bumper, in a bed or to a frame, providing a useful device but not detracting from the appearance of the vehicle when not being use.

The subject matter of the present technology is particularly pointed out and distinctly claimed in the concluding portion of this specification. However, both the organization and method of operation, together with further advantages and embodiments thereof, may best be understood by reference to the following description taken in connection with accompanying drawings wherein like reference characters refer to like elements.

BRIEF DESCRIPTION OF THE DRAWINGS

FIG. 11A is a perspective partial cutaway view of a bumper with the device mounted therein;

FIG. 11B is a side partial cutaway view of a bumper with the device mounted therein;

FIG. 11C is a sectional view of a bumper with the device mounted therein taken along line C-C of FIG. 11B;

FIG. 11D is a sectional view of a bumper with the device mounted therein taken along line D-D of FIG. 11B;

DETAILED DESCRIPTION

The system according to a preferred embodiment of the present disclosure comprises a retractable cable lock that is presented in a linear configuration.

Figure 1:
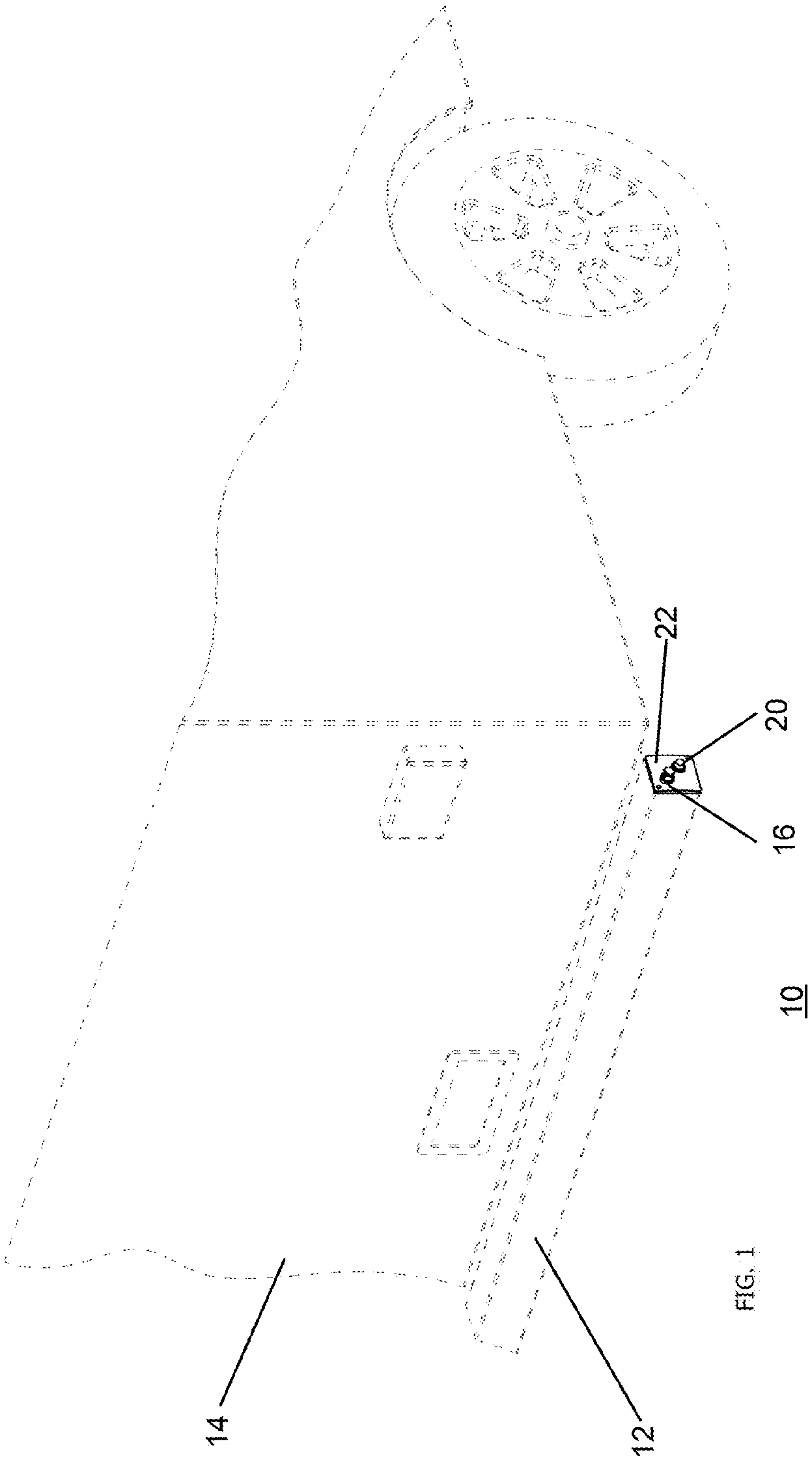
FIG. 1 is a perspective view of a linear retractable cable lock in accordance with the disclosure installed in a bumper of a recreational vehicle.

Referring to FIG. 1, a perspective view of a linear retractable cable lock 10 in accordance with the disclosure installed in a bumper 12 of a recreational vehicle 14. In the particular configuration, the bumper 12 has a hollow interior and components of the cable lock are substantially contained within the interior of the bumper. Externally, the only visible components of the cable lock that might suggest its presence is the end 16 of the cable 18 and a retraction actuator 20, which extend from the outside of an end cap 22 that covers the opening into the interior of the bumper.

Figure 2:
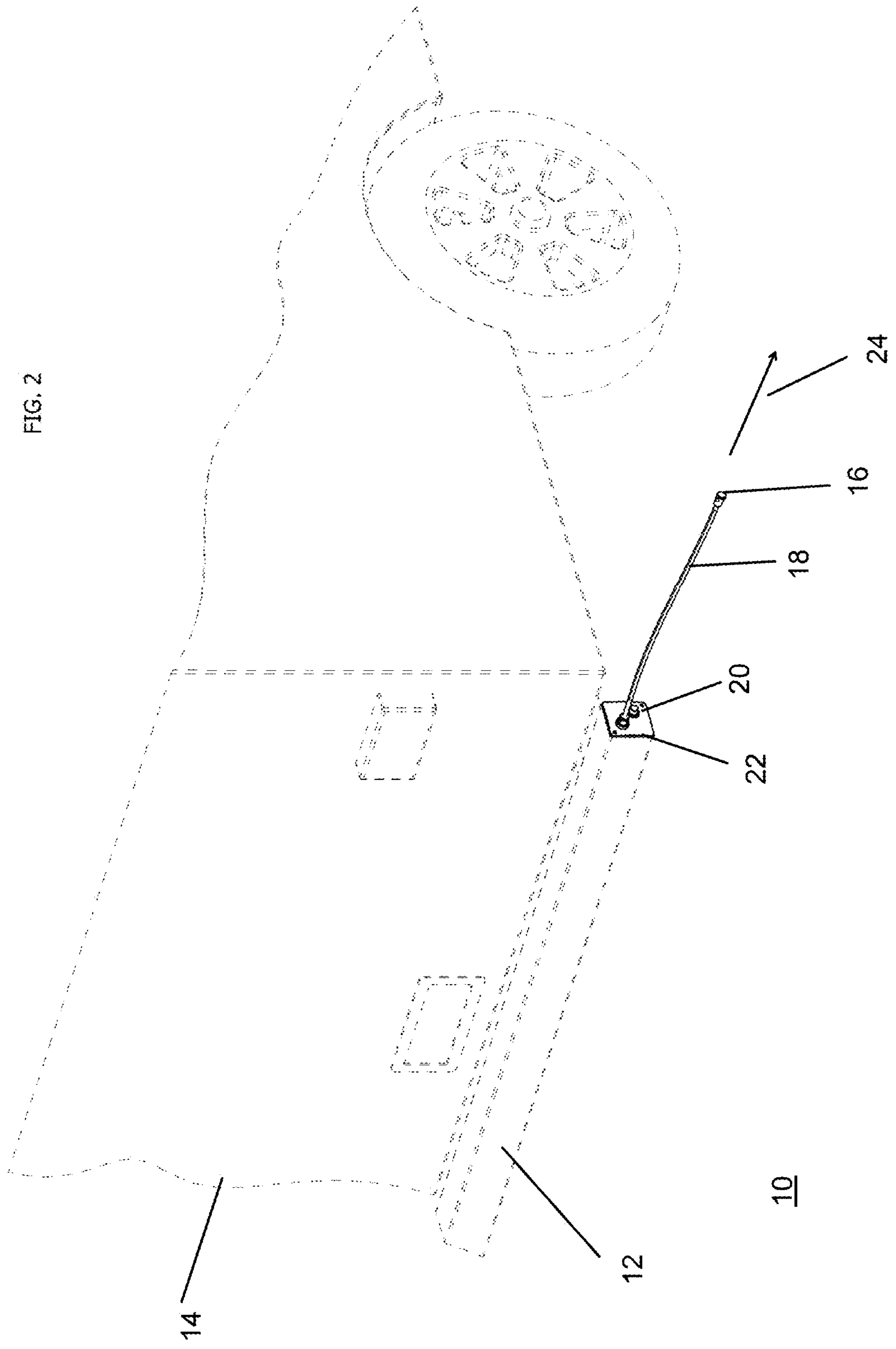
FIG. 2 is a perspective view of the linear retractable cable lock of FIG. 1, in a partially extended state.

Referring to FIG. 2, a view of the configuration of FIG. 1, but with the cable 18 partially extended. The cable is extended by pulling it out of the interior of the bumper, in the general direction of arrow 24. As the cable is extended, the retractable cable lock device ensures that the cable does not retract unintentionally, so the extended cable portion remains extended, until such time as the user operates the retraction actuator, whereupon the device will pull the cable back into the interior of the bumper.

Figure 3:
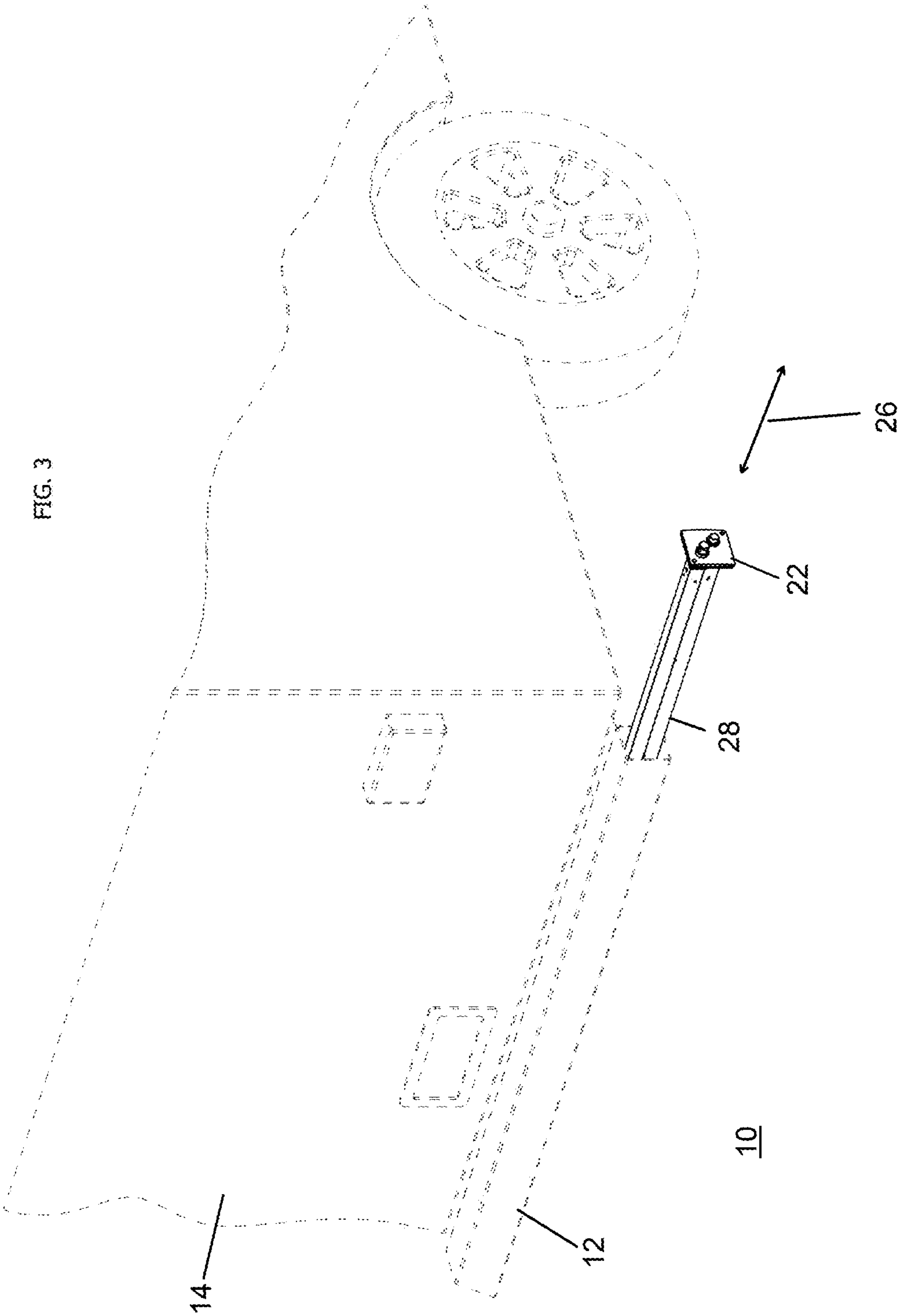
FIG. 3 is a perspective view showing installation of the linear retractable cable lock into the vehicle bumper.

Referring to FIG. 3, a perspective view showing installation of the linear retractable cable lock into the vehicle bumper, the cable lock may be provided as a modular unit that is adapted to be inserted into the interior of the bumper or removed in the direction of arrow 26. End cap 22 is formed to fit securely within the bumper and provide closure to the exterior.

The operation of the device may be better understood beginning with reference to FIGS. 4A-4D, which are a perspective, top, side and right end view of the device in a retracted state, before being installed in a bumper. The device is provided with a case 28 containing the components thereof, which enables the entire device to be easily inserted to the interior of the bumper when installing.

Figures 5A, 5B, 5C:
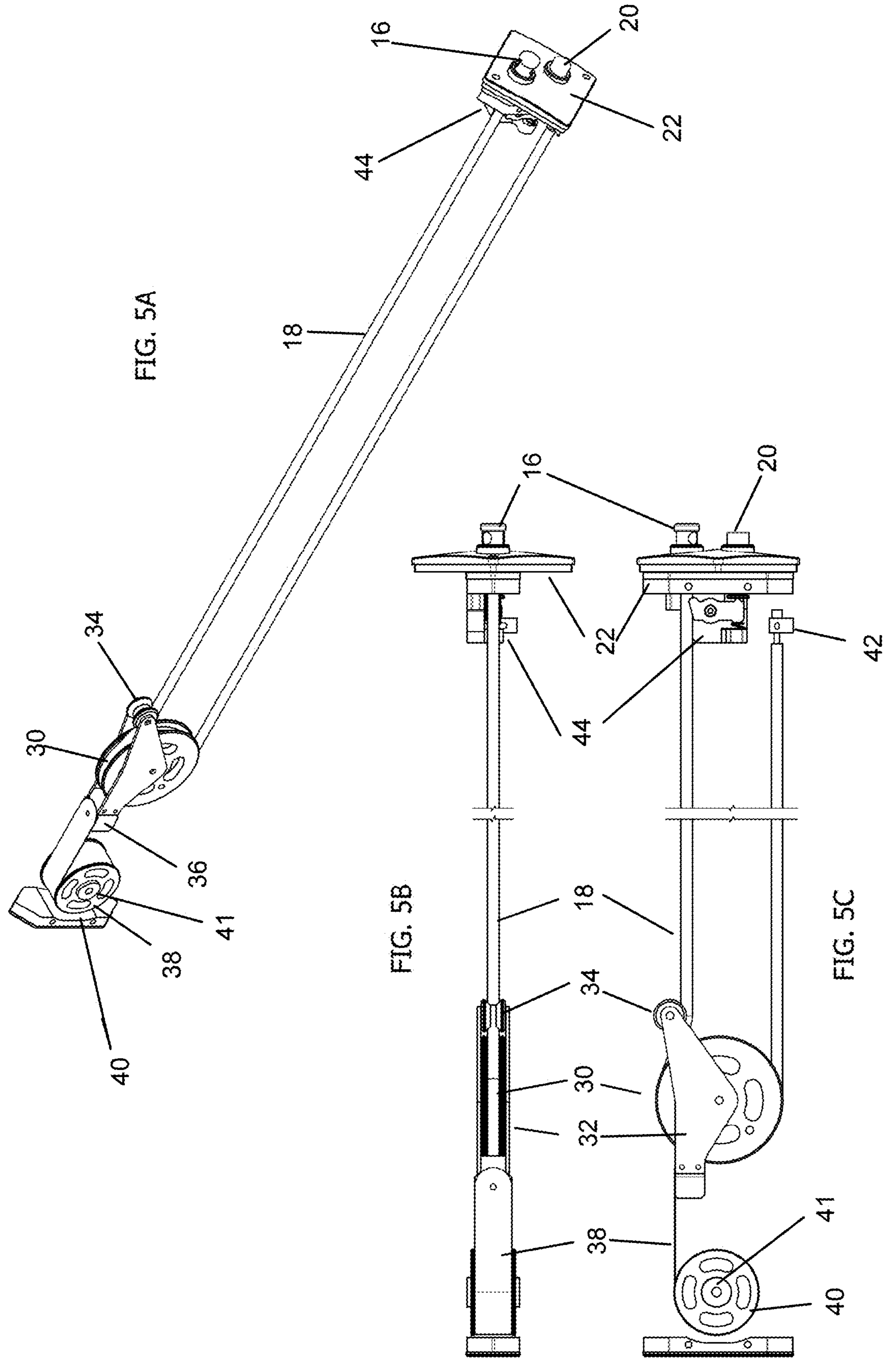
FIG. 5A is a perspective view of the device in a retracted state with the case removed.
FIG. 5B is a top view of the view of FIG. 5A.
FIG. 5C is a side view of the view of FIG. 5A.

FIG. 5A is a perspective view of the device in a retracted state with the case removed, FIGS. 5B and 5C being top and side views thereof. The cable end 16 is mounted to a first end of cable 18, with the cable end positioned outside the exterior face of end cap 22, and the cable passing through a cable opening 25 (not visible) in the end cap. The cable extends a distance (within the interior of the case) and is received by a pulley wheel 30, the cable wrapping around the wheel at a top thereof and traversing around the wheel to exit at the bottom of the wheel, to extend back towards the end cap, the distal end 42 of the cable being secured to at the interior face of the case 28. Wheel 30 is rotationally mounted in a frame 32, the frame carrying a rider wheel 34 extended beyond the edge of the wheel 30 toward the direction of the end cap. The frame holds the rider wheel such that the bottom of the wheel is below the plane of the periphery of the pulley, and cable 18 rides under the lower portion of the rider wheel. At an end of the case 28 opposite from the position of the rider wheel, a mount 36 is connected to a rotary constant force spring 38, and the constant force spring is fixed, in this particular embodiment by being wrapped about a spool 40 which rotates on shaft 41 which is held in place attached to case 28. As the cable approaches an exit hole in cap 22 to the exterior of the case, it passes through a 20 retraction prevention device 44, which operates to hold the cable in an extended position until released, as discussed hereinbelow.

Figures 6A, 6B:
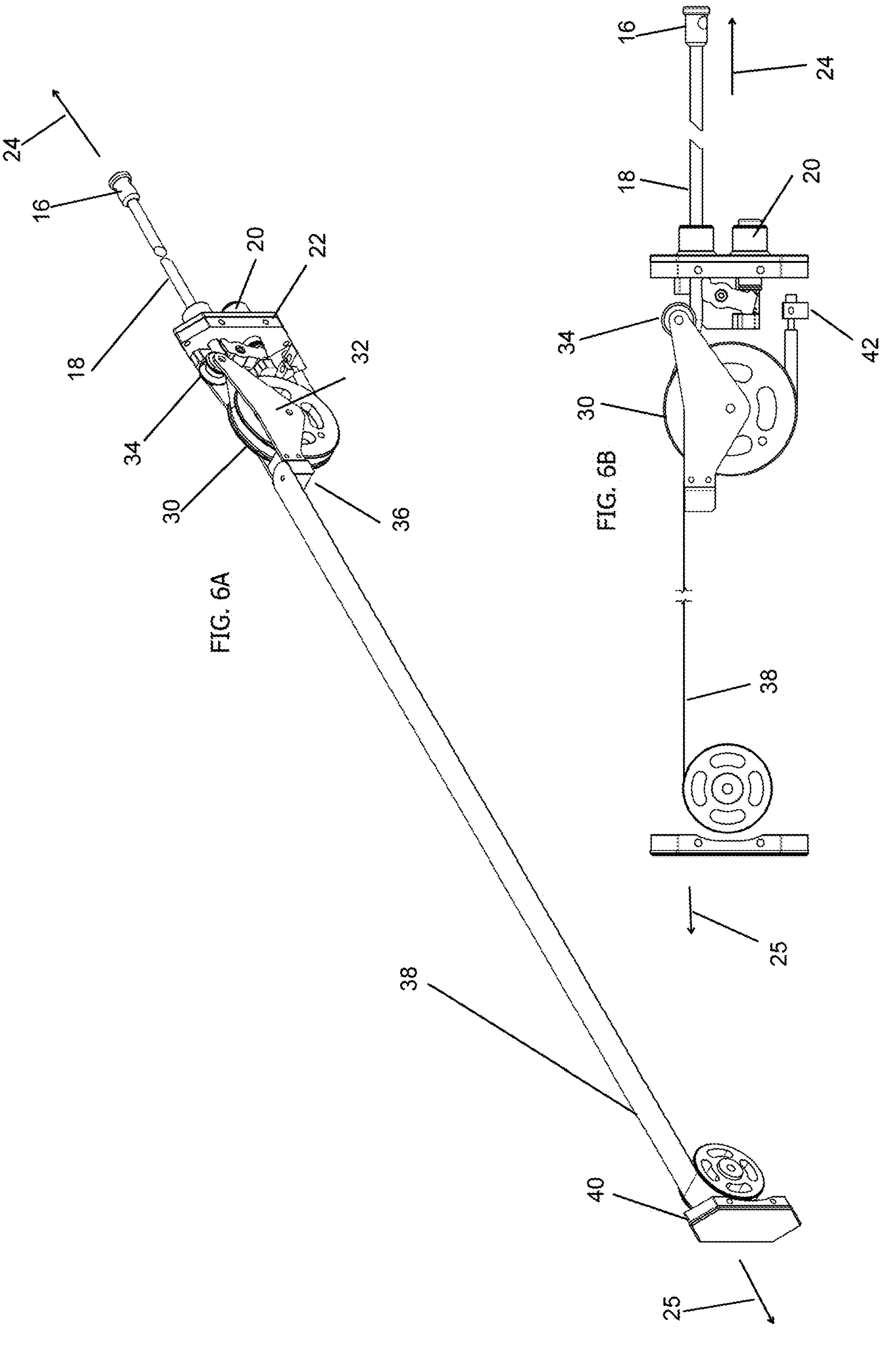
FIG. 6A is a perspective view that illustrates the configuration of the components when the cable is fully extended.
FIG. 6B is a side view of FIG. 6A.

In operation, the device 10 is mounted inside the bumper 12 (for example). When a user desires to use the cable to secure items, such as by passing the cable through portions of bicycles, motorcycles, camping gear, etc. and securing the cable and the items with a lock, the user pulls the cable in the direction of arrow 24, causing the cable to rotate around pulley wheel 30, while the pulley wheel 30 rotates. Rider wheel 34 travels along the cable, and the frame 32 moves towards the end cap 22, while constant force spring 38 extends. Retraction prevention device 44 allows the cable to extend outwardly, but grips the cable when extension movement stops, so that the action of the constant force spring does not pull the cable back from the extension position. However, operation of retraction actuator 44 releases the grip of the retraction prevention device on the cable, so that the force of the spring causes the pulley frame to be pulled back and thereby retracting the cable into the case 28. FIG. 6 illustrates the configuration of the components when the cable is fully extended. In this state, the spring 38 is fully extended, and is exerting a retraction force in the direction of arrow 25. However, the cable is kept in the extended state by the operation of retraction prevention device 44, or by other means as discussed hereinbelow. Rider wheel 34 provides an advantage of keeping the cable from running into the interior edge of the case 28 which could potentially cause the cable to bind.

Figures 4A, 4D:
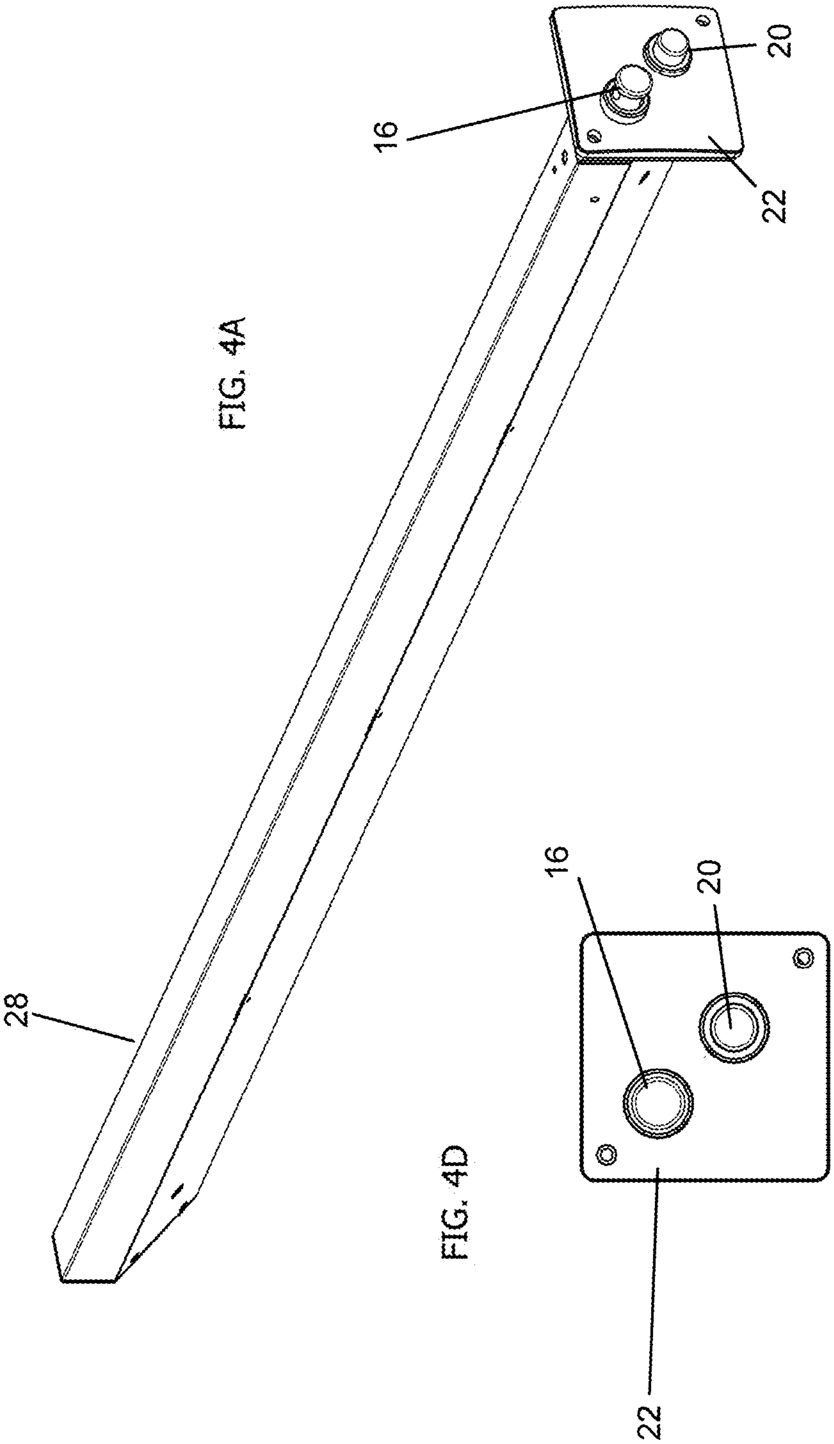
FIG. 4A is a perspective view of the device in a retracted state, before being installed in a bumper.
FIG. 4D is a right end view of the view of FIG. 4A.
Figure 4B:
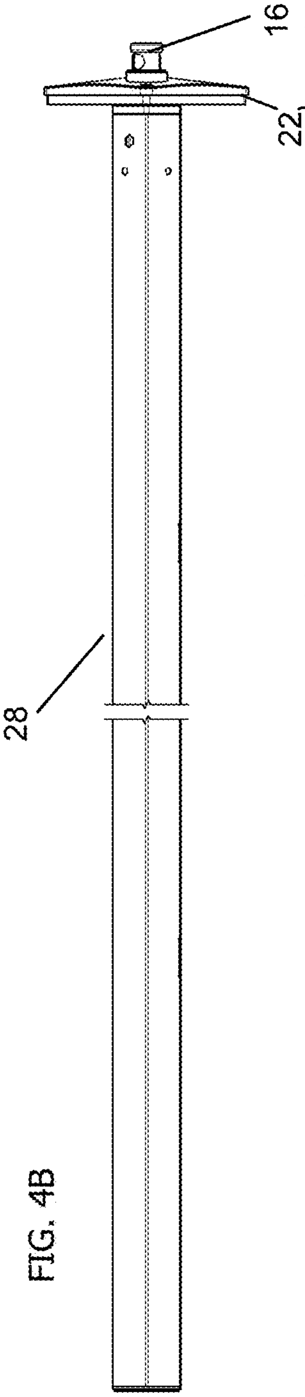
FIG. 4B is a top view of the view of FIG. 4A.
Figure 4C:
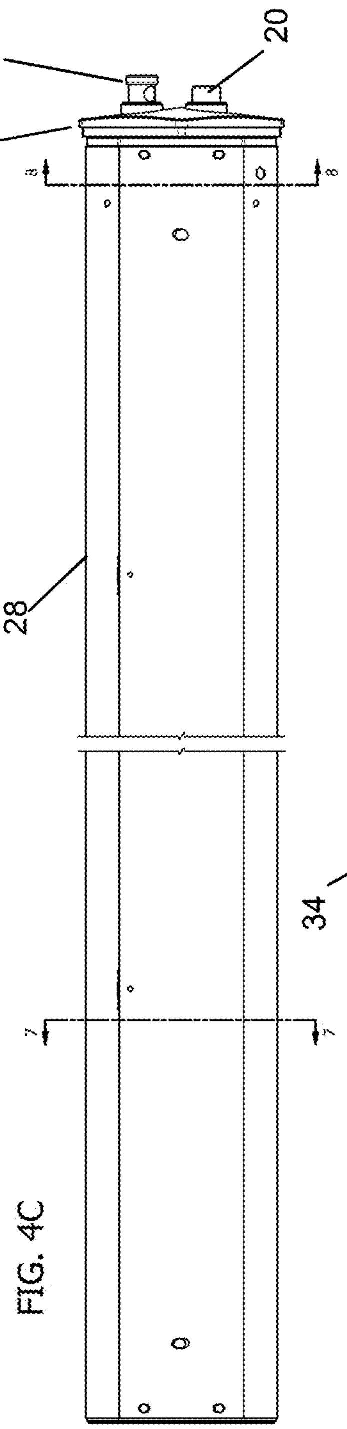
FIG. 4C is a side view of the view of FIG. 4A.
Figure 8:
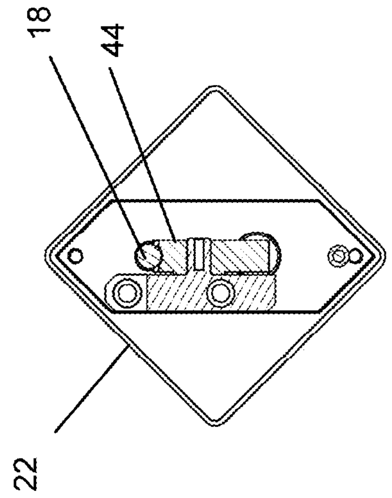
FIG. 8 is a sectional view taken along line 8-8 of FIG. 4C.
Figure 7:
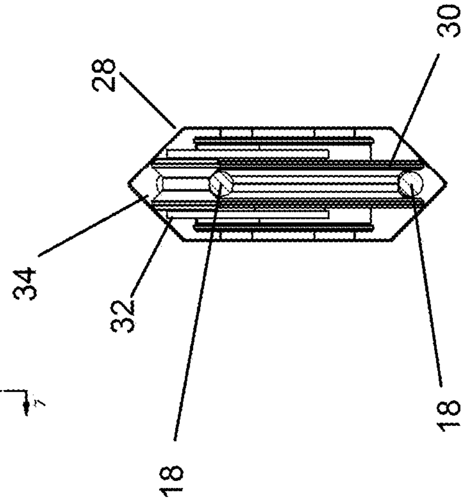
FIG. 7 is a sectional view taken along line 7-7 of FIG. 4C.

Referring now to FIG. 7, a sectional view taken along line 7-7 of FIG. 4C, the placement of the components of the device inside case 28 may be observed. FIG. 8 is a sectional view taken along line 8-8 of FIG. 4C, but as if the case has been inserted into a substantially square cross-section shaped bumper 12 (the view is rotated 45 degrees so that the device is oriented to match the view of FIG. 7, but in use, the device is in an angled orientation inside the bumper).

Figure 9A:
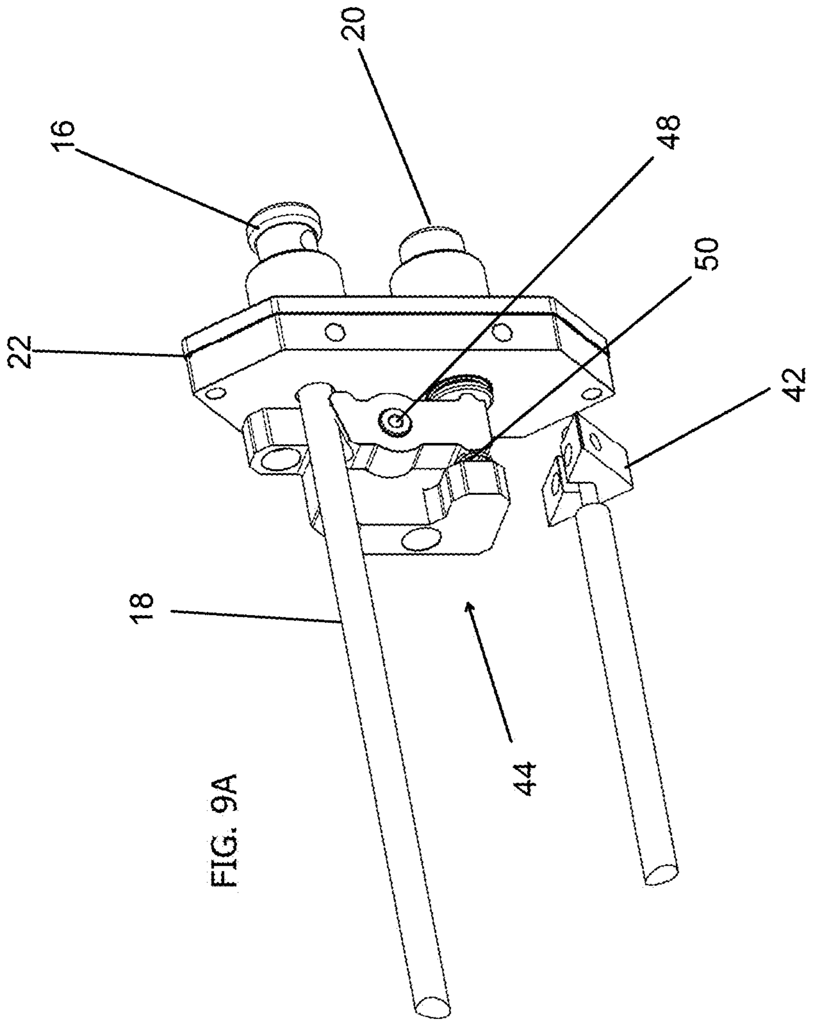
FIG. 9A is a perspective view illustrating the retraction prevention device.
Figure 9D:
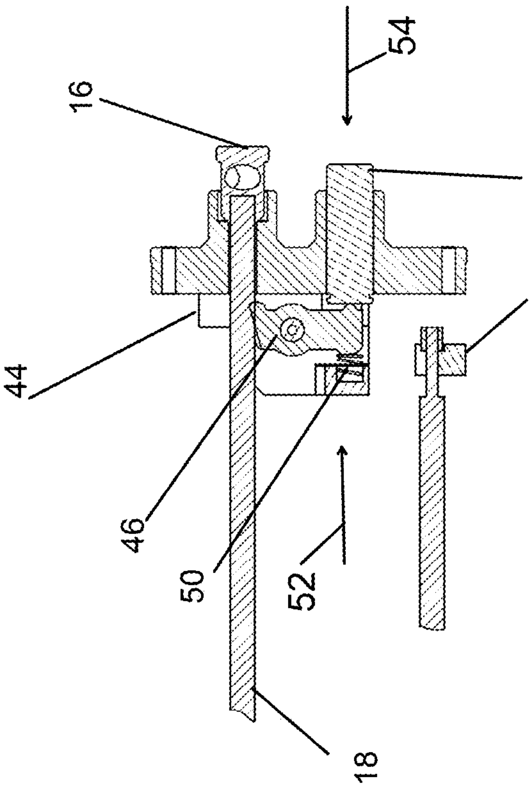
FIG. 9D is a sectional view of the retraction prevention device taken along line D-D of FIG. 9C.
Figure 9C:
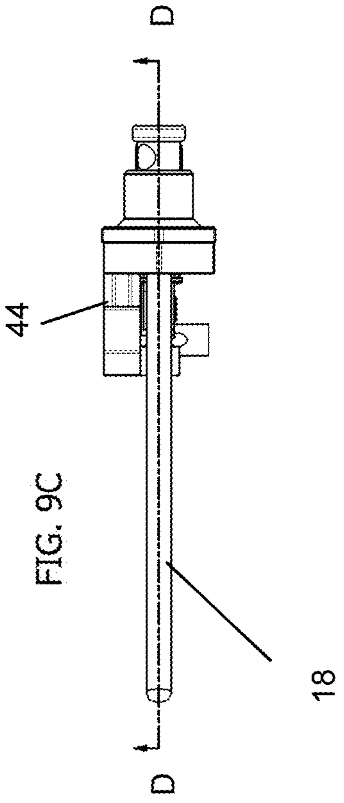
FIG. 9C is a top view of the retraction prevention device in the direction of arrow 44 in FIG. 9A.
Figure 9B:
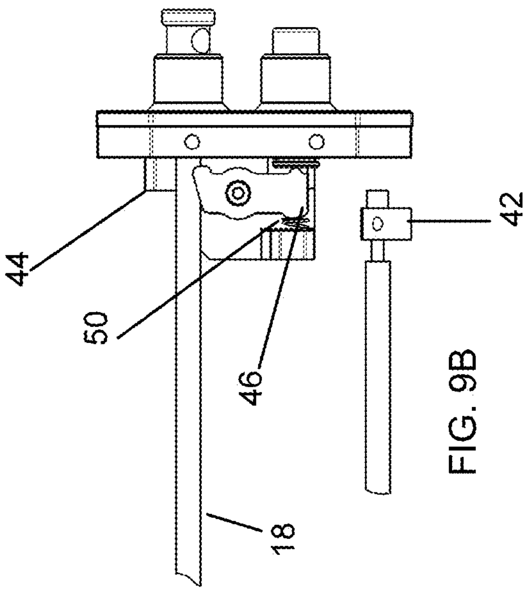
FIG. 9B is a side view of the retraction prevention device.

FIGS. 9A-9D illustration the details the retraction prevention device 44 and its interaction with the cable to maintain the cable in an extracted state and prevent unintended retraction, but allowing retraction when desired. FIG. 9A is a perspective view illustrating the retraction prevention device, which mounts to end cap 22 or other suitable end to the case 28, where the cable 18 passes through an opening in cap 22 to the exterior. The cable is engaged by a cam 46 which is part of device 44, mounted for rotation about axis 48, urged in direction 52 toward end cap 22 by spring 50. Retraction actuator 20 passes through the end cap from the exterior and interacts with the cam at a face opposite the spring. The cam has a rider portion that interacts with the cable, angled upwardly from the interior toward the direction of the opening in the end cap that the cable passes through. In operation, the spring urges the cam so as to engage with the cable, to prevent inward retraction of the cable. However, the angled interaction with the cable allows the cable to be pulled outwardly, but on stopping of extraction force, the cam grips the cable and stops it from retracting. Pushing the retraction actuator 20 in the direction of arrow 54 rotates the bottom of the cam rearwardly, such that the upper portion of the cam moves away from interaction with the cable, thus allowing the cable to retract.

A first alternative manner of maintaining the cable in the extracted state is illustrated in connection with FIGS. 10A-10E. In this configuration, instead of use of a retraction actuator 20, the opening in the end cap is slightly off of alignment with the cable as it comes off the pulley, providing a slight bias to the cable as it comes into the opening such that frictional interaction with the cable and the opening in the end cap will grip the cable sufficiently to prevent retraction in absence of the user feeding the cable inwardly to urge the cable to retract.

Referring to FIGS. 14A-14D and FIGS. 15A-15D, a second alternative and preferred configuration for maintaining the cable in the extracted state when so desired is shown and described.

Figures 10A, 10B, 10C, 10D, 10E:
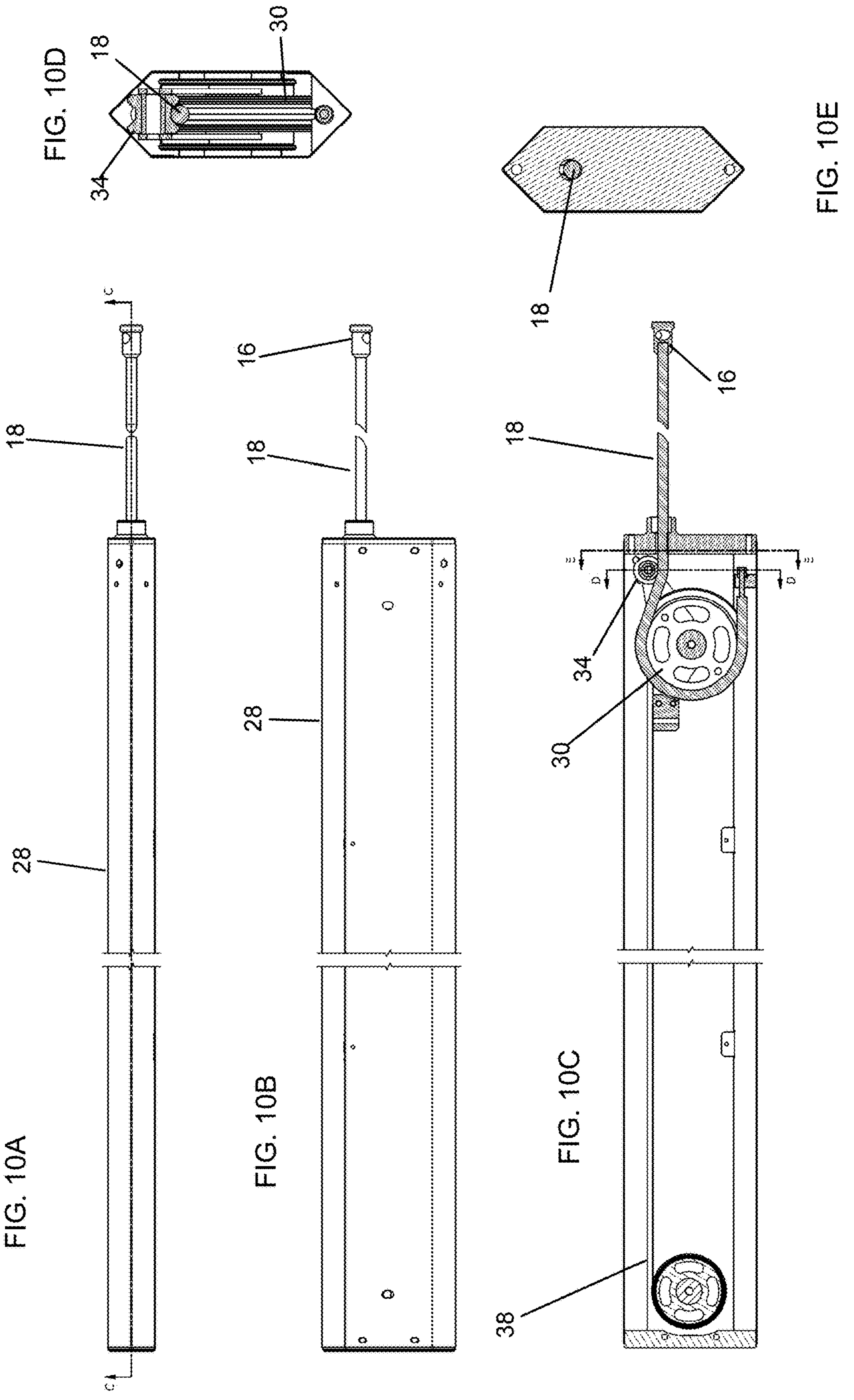
FIG. 10A is a top view of the device with a first alternative retraction control configuration.
FIG. 10B is a side view of the device of FIG. 10A.
FIG. 10C is a sectional view taken along line C-C of FIG. 10A.
FIG. 10D is a sectional view taken along line D-D of FIG. 10C.
FIG. 10E is a sectional view taken along line E-E of FIG. 10C.

The top and side views of FIGS. 14A, 14B, 15A and 15B are similar to those of FIGS. 10A and 10B. However, internally, the configuration is different at the interior of the device at the exit hole in cap 22' where the cable exits the case 28'. In this configuration, just above opening of the exit hole, a magnet 51 is mounted on the inner face of cap 22'. Frame 32' that carries rider wheel 34' is suitably made of a ferromagnetic material that is strongly attracted to magnets, whereby when the cable is fully extended in the direction of arrow 56, the frame 32' is adjacent the magnet 51, and the magnet attracts and holds the frame in position with the cable in the fully extended position, so that the cable will not retract under the effect of the constant force spring 38'.

Once a user is ready to have the cable retract, the user moves the cable inwardly to the case in the direction of arrow 58, which causes the frame 32' to be pushed away from engagement by the magnet 51, and once moved a sufficient distance 60 away from the magnet so that the magnet will no longer engage with the frame 32', the constant force spring 38' is then able to retract the cable into the interior of the case 28'.

FIG. 11A-11D further illustrate the installation of the device in a bumper. As seen in the partially cut away views in FIGS. 11A and 11B, the device fits at an angle within the square profile bumper. This maximizes the available size of the device and components.

Figure 12:
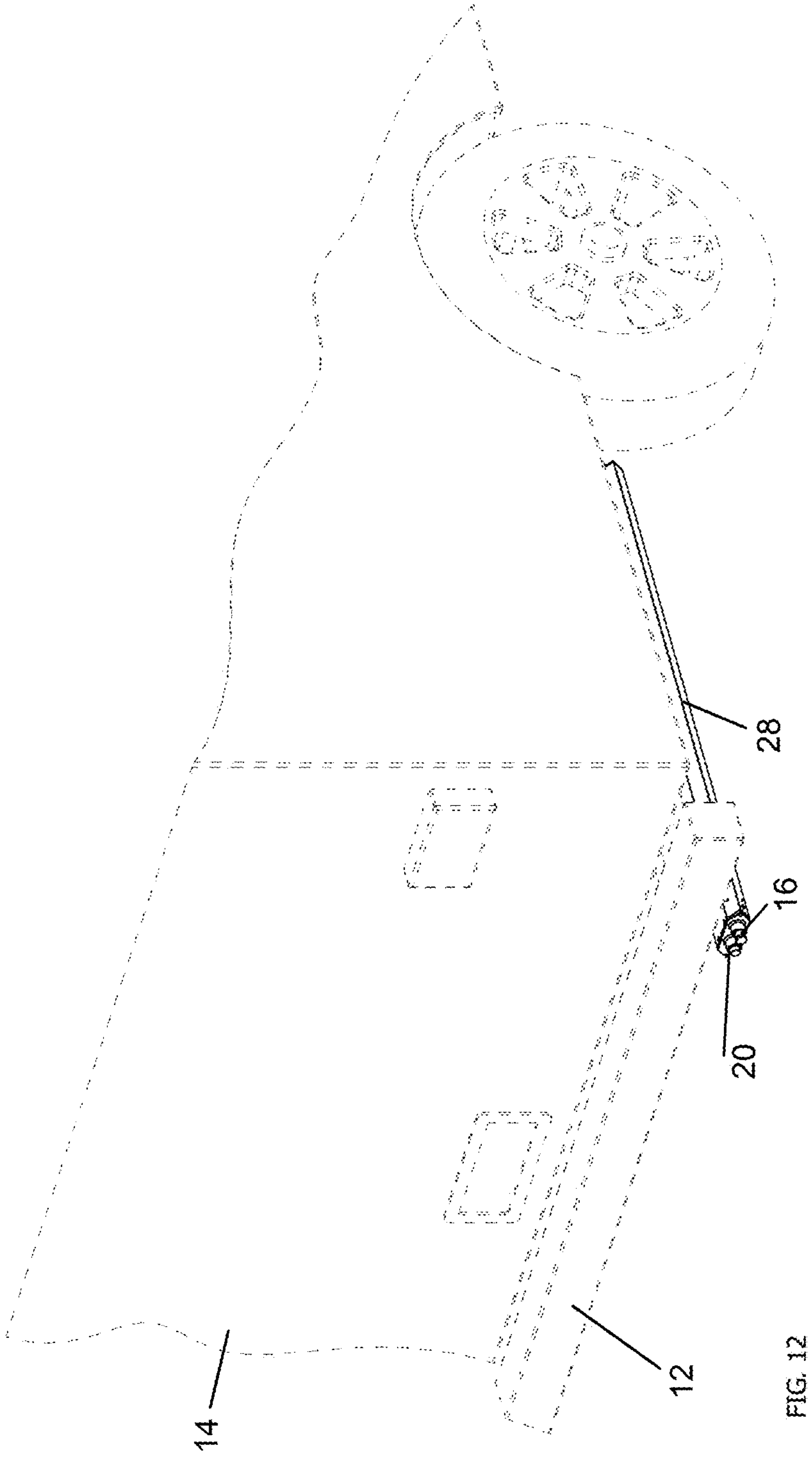
FIG. 12 is a perspective view of an alternative mounting method to a frame of a recreational vehicle.
Figure 13:
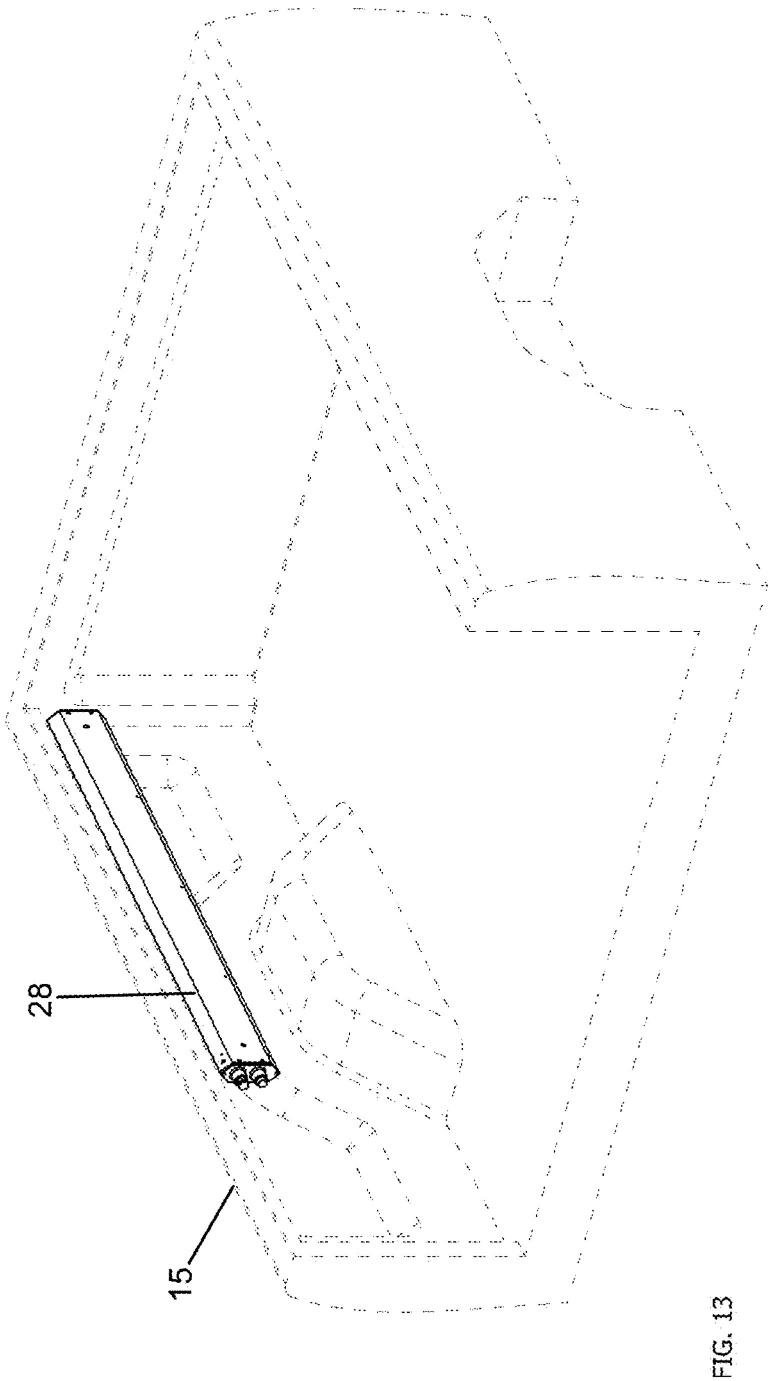
FIG. 13 is a perspective of another alternative mounting method in the bed of a pickup.
Figures 14A, 14B, 14C, 14D:
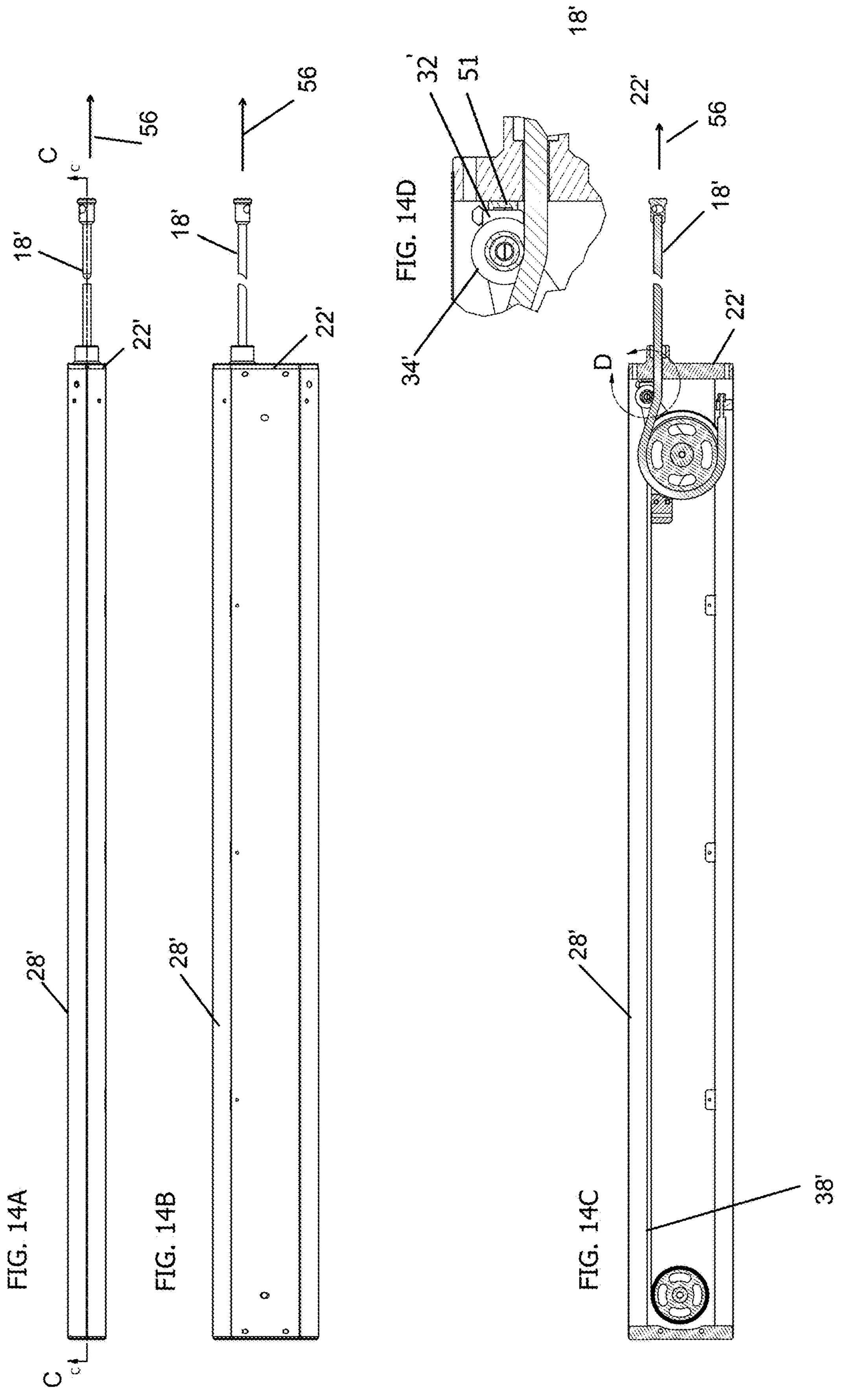
FIG. 14A is a top view of the device with a second alternative retraction control configuration.
FIG. 14B is a side view of the device of FIG. 14A.
FIG. 14C is a sectional view taken along line C-C of FIG. 14A.
FIG. 14D is an sectional view of the region D of FIG. 14C, illustrating the retraction control engaged to prevent retraction.
Figures 14A, 14B, 14C, 14D:
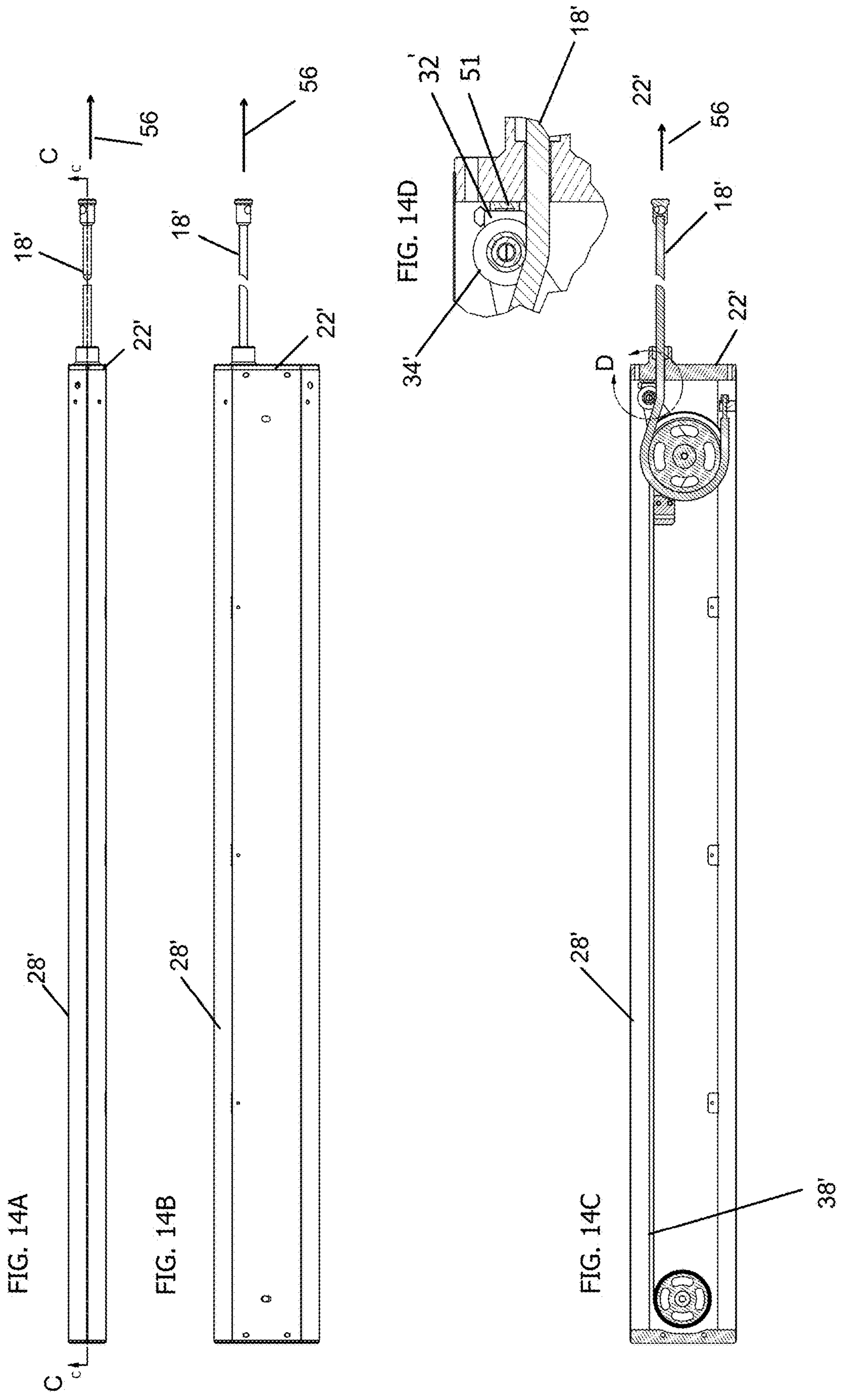
Figures 15A, 15B, 15C, 15D:
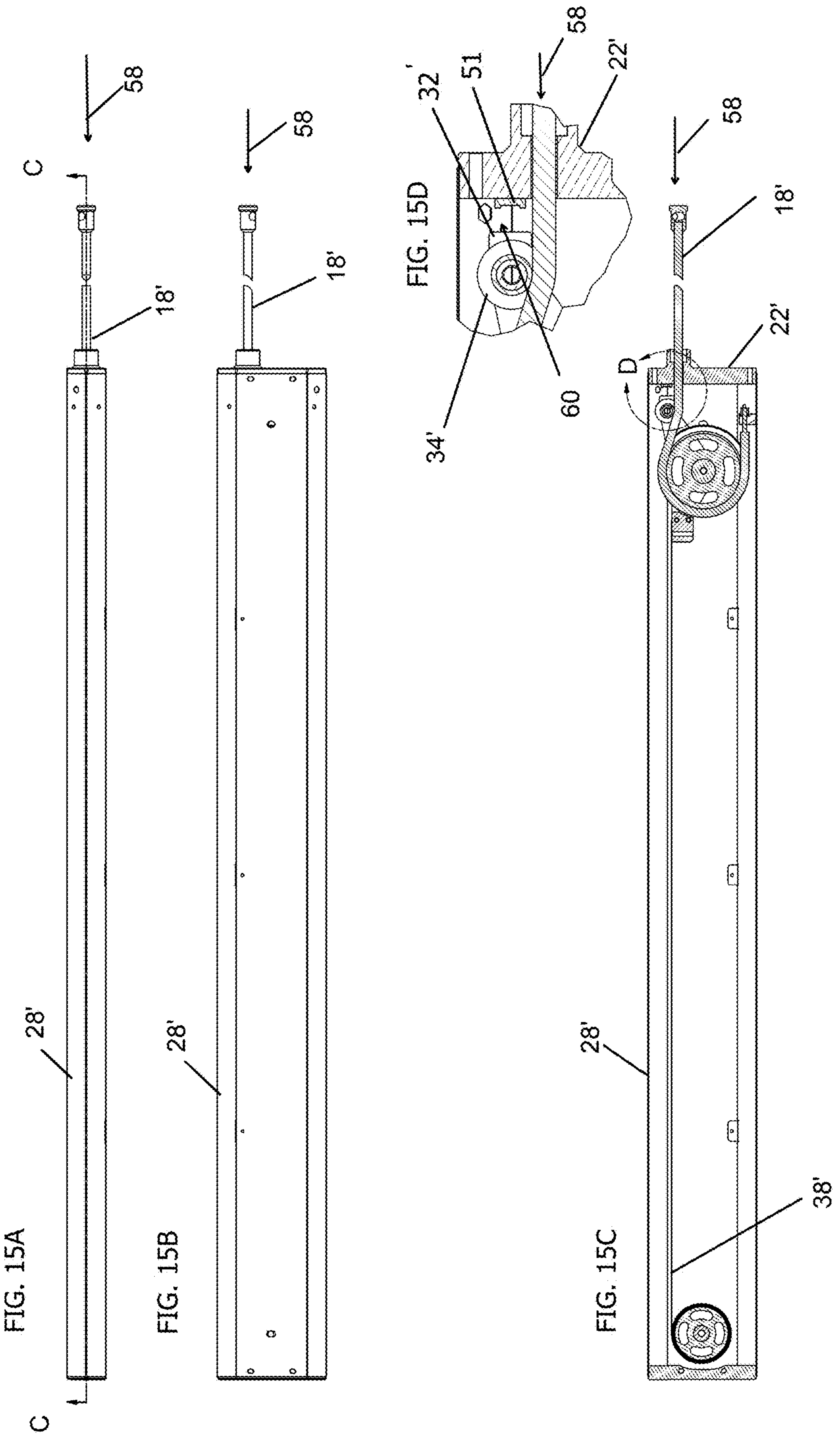
FIG. 15A is a top view of the device of FIG. 14A, illustrating how to disengage the second alternative retraction control configuration.
FIG. 15B is a side view of the device of FIG. 15A.
FIG. 15C is a sectional view taken along line C-C of FIG. 15A.
FIG. 15D is an sectional view of the region D of FIG. 15C, illustrating the retraction control when disengaged, to allow retraction.

FIG. 12 is a perspective view of an alternative mounting method to a frame of a recreational vehicle. In this mounting, the case 28 is attached to the frame of the vehicle, oriented front to back of the vehicle in this particular illustration, and FIG. 13 is a perspective of another alternative mounting method in the bed of a pickup, wherein the case 28 is secured to a side wall of the pickup bed 15, for example.

In accordance with the invention, an improved retractable cable lock is provided in a linear configuration, for mounting within a bumper, to a vehicle frame, to a pickup bed, or the like.

While a preferred embodiment of the technology has been shown and described, it will be apparent to those skilled in the art that many changes and modifications may be made without departing from the broader aspects. The appended claims are therefore intended to cover all such changes and modifications as fall within the true spirit and scope of the technology.

What is claimed is:

1. A retractable cable lock, comprising:
- a case having a length and having an extensible cable therein for linear extension and retraction from the case; and
- a retraction mechanism for urging the cable to retract into the case,
- further comprising a mechanism for maintaining the extensible cable in an extended position despite the retraction mechanism's urging,
- wherein said mechanism for maintaining the extensible cable in an extended position comprises a fixed magnet positioned in said case.

2. The retractable cable lock according to claim 1, further comprising a pulley within said case around which said cable travels, from a securement point, around the pulley and to an exit opening in said case.

3. The retractable cable lock according to claim 2, wherein said pulley is adapted to travel within said case along a portion of the length thereof.

4. The retractable cable lock according to claim 3, wherein said retraction mechanism comprises a constant force spring fixed in position relative to said case, and attached to said pulley, for urging said pulley toward a retraction position.

5. A retractable cable lock, comprising:
- a case having a length and having an extensible cable therein for linear extension and retraction from the case; and
- a retraction mechanism for urging the cable to retract into the case,
- further comprising a pulley within said case around which said cable travels, from a securement point, around the pulley and to an exit opening in said case,
- wherein said pulley is adapted to travel within said case along a portion of the length thereof,
- further comprising a mechanism for maintaining the extensible cable in an extended position despite the retraction mechanism's urging,
- wherein said mechanism for maintaining the extensible cable in an extended position comprises a fixed magnet positioned in said case for securing said pulley against traveling in absence of a user's interaction.

6. The retractable cable lock according to claim 5, wherein said retraction mechanism comprises a constant force spring fixed in position relative to said case, and attached to said pulley, for urging said pulley toward a retraction position.

7. A retractable cable lock, comprising:
- a vehicle bumper having a length and having an extensible cable therein for linear extension and retraction from the bumper; and
- a retraction mechanism for urging the cable to retract into the bumper
- further comprising a mechanism for maintaining the extensible cable in an extended position despite the retraction mechanism's urging,
- wherein said mechanism for maintaining the extensible cable in an extended position comprises a fixed magnet positioned in said case.

8. The retractable cable lock according to claim 7, further comprising a pulley within said bumper around which said cable travels, from a securement point, around the pulley and to an exit opening in said bumper.

9. The retractable cable lock according to claim 8, wherein said pulley is adapted to travel within said bumper along a portion of the length thereof.

10. The retractable cable lock according to claim 9, wherein said retraction mechanism comprises a constant force spring fixed in position relative to said bumper, and attached to said pulley, for urging said pulley toward a retraction position.

11. A retractable cable lock, comprising:
- a vehicle bumper having a length and having an extensible cable therein for linear extension and retraction from the bumper; and
- a retraction mechanism for urging the cable to retract into the bumper,
- further comprising a pulley within said bumper around which said cable travels, from a securement point, around the pulley and to an exit opening in said bumper,
- wherein said pulley is adapted to travel within said bumper along a portion of the length thereof
- further comprising a mechanism for maintaining the extensible cable in an extended position despite the retraction mechanism's urging,
- wherein said mechanism for maintaining the extensible cable in an extended position comprises a fixed magnet positioned in said case for securing said pulley against traveling in absence of a user's interaction.

12. The retractable cable lock according to claim 11, wherein said retraction mechanism comprises a constant force spring fixed in position relative to said bumper, and attached to said pulley, for urging said pulley toward a retraction position.

13. A retractable cable lock, comprising:

a case having a length and having an extensible cable therein for linear extension and retraction from the case; and a carriage adapted to travel within said case along a portion of the length thereof, said carriage having a pulley and a rider wheel, wherein said cable is received by said pulley to travel around a portion thereof, said rider wheel guiding said cable to travel around said pulley and keeping said cable from rubbing against an interior wall of said case.

14. The retractable cable lock according to claim 13, wherein said carriage travels along the portion of the length of the case as said cable extends and retracts from the case.

15. The retractable cable lock according to claim 13, wherein the positioning of said rider wheel on said carriage is such that a bottom position of the rider wheel is below a plane of a periphery of the pulley.

16. A retractable cable lock, comprising:

a case having a length and having an extensible cable therein for linear extension and retraction from the case; and a translatable carriage within said case, said carriage having a pulley around which said cable travels, from a securement point and to an exit opening in said case;

said translatable carriage further having a rider wheel for guiding said cable to said pulley and for keeping said cable from rubbing against an interior wall of said case.

17. The retractable cable lock according to claim 16, wherein said translatable carriage travels along the portion of a length of the case as said cable extends and retracts from the case.

18. The retractable cable lock according to claim 16, wherein said translatable carriage positions said rider wheel such that a bottom position of the rider wheel is below a plane of a periphery of the pulley.

* * * * *